(No Model.) 2 Sheets—Sheet 1.
J. J. BURKE.
RAILWAY CATTLE GUARD.
No. 493,972. Patented Mar. 21, 1893.
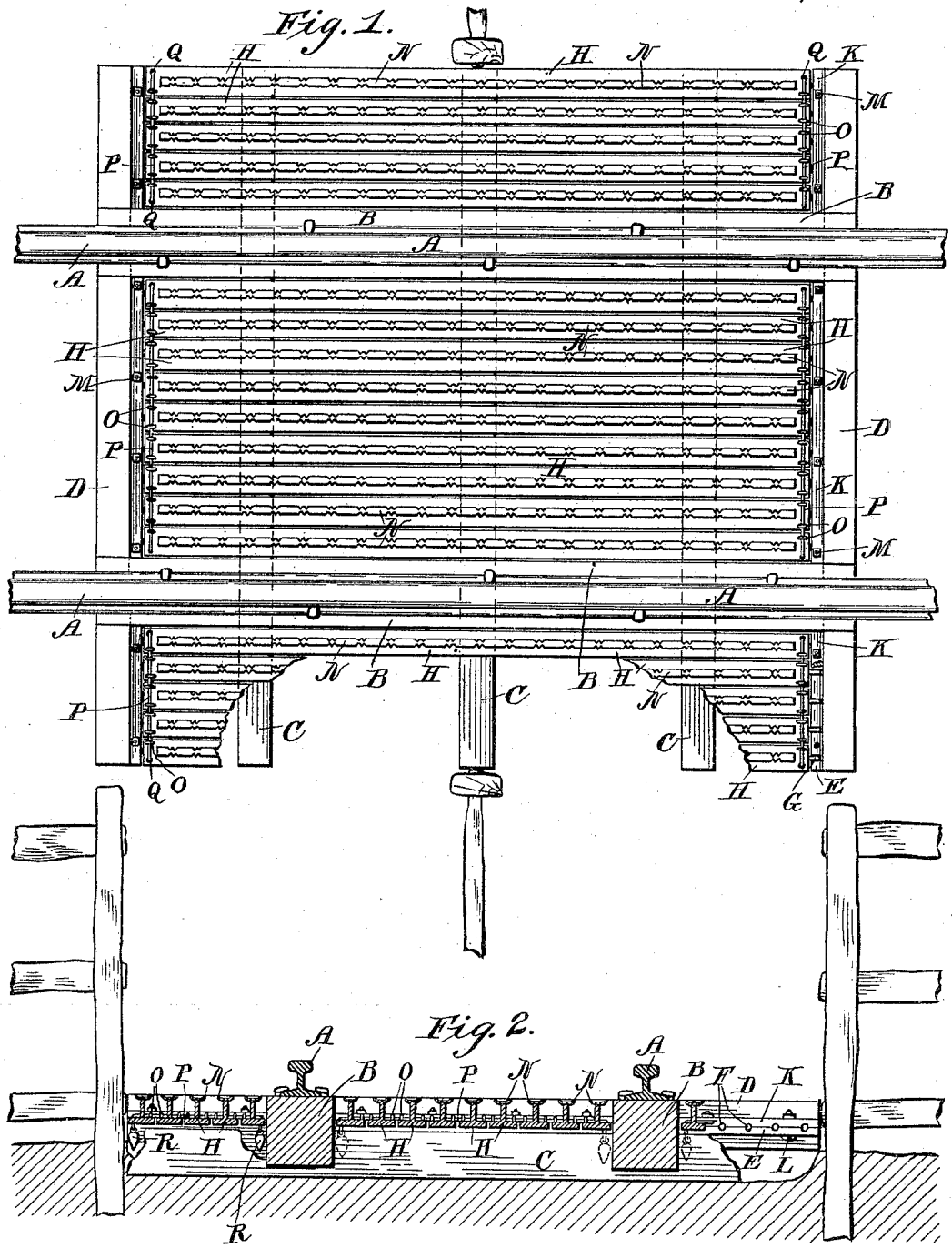
Witnesses
Severance
Ralph Daskam
Inventor
John J. Burke
By John Wedderburn
Attorney (No Model.) 2 Sheets—Sheet 2.

J. J. BURKE.
RAILWAY CATTLE GUARD.

No. 493,972. Patented Mar. 21, 1893.

Witnesses
Severance
Ralph Daskam.

Inventor
John J. Burke,
By John Wedderburn
Attorney

UNITED STATES PATENT OFFICE.

JOHN J. BURKE, OF ROSEBURG, OREGON.

RAILWAY CATTLE-GUARD.

SPECIFICATION forming part of Letters Patent No. 493,972, dated March 21, 1893.

Application filed May 28, 1892. Serial No. 434,779. (No model.)

*To all whom it may concern:*

Be it known that I, JOHN J. BURKE, of Roseburg, in the county of Douglas and State of Oregon, have invented certain new and useful Improvements in Railway Cattle-Guards; and I do hereby declare the following to be a full, clear, and exact description of the invention, such as will enable others skilled in the art to which it appertains to make and use the same.

My invention relates to an improved form of cattle-guard to prevent cattle or other animals from straying on a railway track; and it consists in certain means for automatically gripping the foot of an animal attempting to walk upon said guard, and for automatically releasing the animal's foot when it retreats therefrom, as illustrated in the accompanying drawings, in which:—

Figure 3:
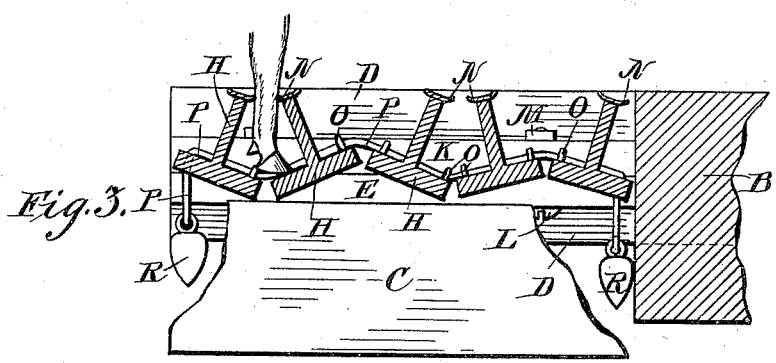
Figure 4:
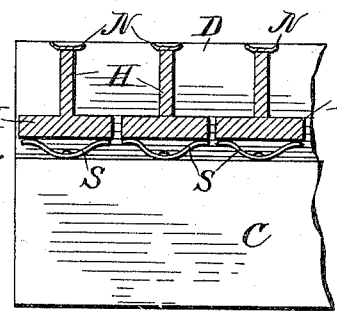
Figure 5:
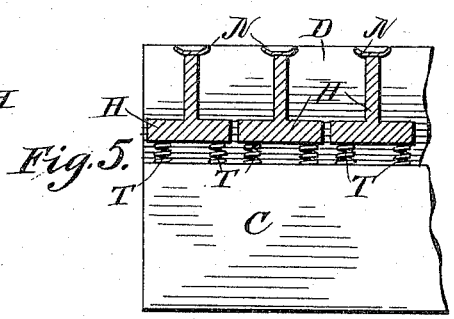
Figure 6:
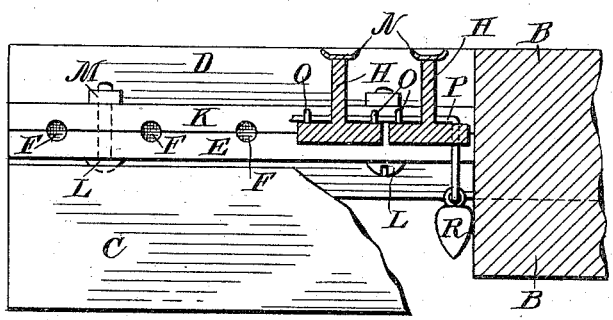
Figure 7:
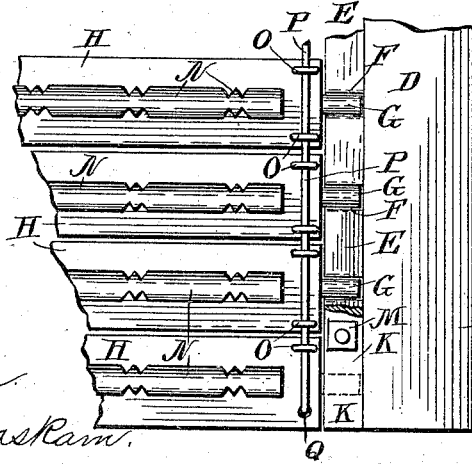

Figure 1 is a plan view of my improved cattle-guard, a part thereof being broken away to show the cross-ties. Fig. 2 is a transverse sectional view thereof, with parts of the ties removed to show the sleepers or end-ties. Fig. 3 is a detail sectional view on a larger scale, showing the mode of operation of the slats and grip-strips. Figs. 4 and 5 are like views showing alternative devices for restoring the slats to their normal positions; and Figs. 6 and 7 are detail sectional and plan views showing the mode in which the slats are pivoted in rest-pieces on the end-ties.

The rails A of the track rest upon and are spiked to the stringers B, which are mortised to receive and rest upon the cross-ties C; the ends of the stringers are cut away to leave shoulders, which rest upon the end-ties or sleepers D mortised to receive said shoulders. Integral with said sleepers or secured thereto are the rest pieces E, in which are semi-cylindrical bearings F to receive the journals or gudgeons G of the slats H. The upper parts of the bearings for these journals are formed in the plates K, which are removably secured to the rests E by bolts L and nuts M, as shown in Figs. 6 and 7. The slats H are of an inverted-T form in cross-section, and to the upper edge of each slat is secured a metallic grip-strip N, having upturned and roughened edges. It will be seen that, by this arrangement, upon an animal attempting to cross the guard, the pressure of its foot upon the sides of the slats will cause these slats to turn in their bearings until their lower edges rest upon the cross-ties C; in this position the leg of the animal will be grasped between the grip-strips, causing the animal to withdraw its foot, which it is at liberty to do. I preferably place nine such slats between the rails and five slats outside the track, on each side thereof, but any number may be used, as may be found desirable.

In order to restore the slats to their original positions when the animal has withdrawn its foot, I provide each slat at the ends thereof with loops or eyes O, through which passes a round chain P, which also passes through holes Q in the outer edge of the outer slats of each series, and at the ends of these chains are suspended weights R, as shown in Fig. 3. I may also employ, for restoring the slats to their normal positions, springs between the slats H and the cross-ties C; these springs may be either bow-springs S, secured at their middle points to the cross-ties as in Fig. 4, or spiral springs T, one on each side of the slat, as shown in Fig. 5. By this arrangement no pit is required to be dug, and, when repairs are needed in the track, by removing the nuts M the plates K may be taken up and the slats removed, so that the cross-ties can be tamped up just as any other ties along the track.

Having thus fully described my invention, what I claim, and desire to secure by Letters Patent, is—

1. In a railway cattle-guard, the combination with a frame-work, of a series of parallel slats, journaled in said frame work, said slats being of an inverted-T cross-section and a rope or cord passing through loops or eyes on each of said parallel slats, said cord bearing a weight at its ends, substantially as and for the purpose set forth.

2. In a railway cattle-guard, the combination with a frame-work, of a series of parallel slats, journaled in said frame-work, said slats being of an inverted-T cross-section, and metallic grip-strips secured to the upper edges of said slats, substantially as described.

In testimony whereof I have signed this specification in the presence of two subscribing witnesses.

JOHN J. BURKE.

Witnesses:
L. WIMBERLY,
S. B. HENDRICKS.